May 8, 1962  E. T. G. LIND  3,033,409
INSERT FOR VESSELS CONTAINING PILLS, TABLETS OR THE LIKE
Filed June 8, 1959  3 Sheets-Sheet 1

INVENTOR
Evald Torbjorn Gustav Lind

BY Watson, Cole, Grindle & Watson
ATTORNEYS

May 8, 1962  E. T. G. LIND  3,033,409
INSERT FOR VESSELS CONTAINING PILLS, TABLETS OR THE LIKE
Filed June 8, 1959  3 Sheets-Sheet 2

INVENTOR
Evald Torbjorn Gustav Lind

BY Watson, Cole, Grindle & Watson
ATTORNEYS

May 8, 1962　　　E. T. G. LIND　　　3,033,409
INSERT FOR VESSELS CONTAINING PILLS, TABLETS OR THE LIKE
Filed June 8, 1959　　　　　　　　　　3 Sheets—Sheet 3

INVENTOR
Evald Torbjorn Gustav Lind

BY Watson, Cole, Grindle & Watson
ATTORNEYS

United States Patent Office 3,033,409
Patented May 8, 1962

3,033,409
INSERT FOR VESSELS CONTAINING PILLS, TABLETS OR THE LIKE
Evald Torbjorn Gustav Lind, Osterlanggatan 38B, Trollhattan, Sweden
Filed June 8, 1959, Ser. No. 818,587
Claims priority, application Sweden Feb. 28, 1959
8 Claims. (Cl. 215—100)

To prevent tablets, pills, dragées and similar articles in jars or bottles or other vessels of glass or other material from rubbing against each other and from rattling in the jar, it has hitherto been usual to employ cotton wads which were torn manually from a supply of cotton and then stuffed into the jar so that the space therein between its contents and the cap was filled. This is an impractical, unhygienic and irrational means of preventing movement of the tablets etc. in the jar when this is moved or transported.

The object of the present invention is to provide an insert for vessels for tablets, pills or the like, which is removably positioned in the vessel above its contents for the purpose referred to and which is so devised that it is free from the objections and disadvantages associated with the use of cotton wads.

The insert provided by the present invention consists essentially of a star-shaped object made of a resilient material and comprising arms projecting from a central body, said arms being of such length relatively to the diameter of the vessel, that only after bending the arms against their resiliency the insert can be introduced into the vessel so that the central body engages the contents of the vessel and the bent arms extend toward the mouth of the vessel and are pressed against the inner wall of the vessel by their resiliency In one embodiment which is very advantageous the outer end portions of the arms are permanently bent or inclined from the main portion of the arms so that after introducing the insert into the vessel, the end portions are directed substantially toward each other. Thereby, the outer ends of the arms will not be jammed between the closure means and the mouth of the vessel. Preferably, the central portion of the insert is formed with a recess which serves to facilitate a central positioning of the insert on the vessel mouth before it is pushed into the vessel and if desired also to receive the end of a mandrel or similar member by means of which the insert is pushed into the vessel.

The invention will be explained more in detail below with reference to the accompanying drawings which show some embodiments serving to exemplify the invention.

The insert is preferably made of a soft resilient synthetic plastic material or synthetic plastic sheet, such as polyethylene, but cardboard, metal foil or the like may also be used as material for the insert.

Depending on the size of the vessel and its mouth, the insert may be manufactured with three or more arms. In most cases, a number of 8, 10 or 12 arms will be found most suitable.

Figure 1:
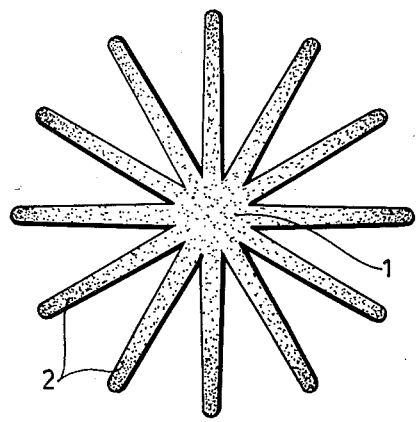
FIGURE 1 shows a top plan view of an insert in one embodiment of the present invention.

The embodiment illustrated in FIGURE 1 represents the most simple manner of putting the invention into practice. This embodiment is entirely flat and comprises a number of arms 2 extending radially outwardly from a central body 1, so that in the unrestrained state of the insert said arms are coplanar with the central body 1. The embodiment illustrated in FIGURES 2 and 3 differs from that of FIGURE 1 in that the arms are formed with permanently bent end portions 3, which are only a fraction of the total length of the arm. These bent portions are all directed toward the same side from the common plane of the arms. Furthermore, according to FIGURES 2 and 3 the central portion 1 is formed with a depression or recess 4 directed toward the opposite side of said common plane from that of the bent end portions 3.

Figure 2:
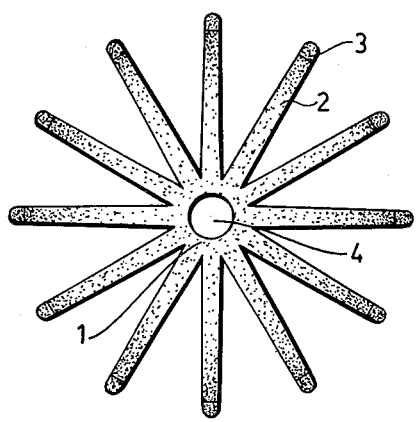
FIGURE 2 is a similar view of an insert in a second embodiment of the invention.
Figure 3:
FIGURE 3 shows a vertical cross-section of the insert of FIGURE 2.

The procedure of positioning the insert shown in FIGURES 2 and 3 in a tablet jar of, e.g. glass, will now be described with reference to FIGURES 4 to 11, which illustrate this procedure somewhat diagrammatically.

Figure 4:
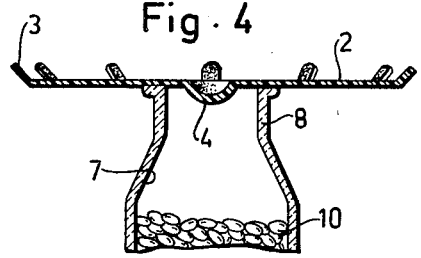
FIGURES 4 to 11 illustrate the introduction of the insert into a vessel and its position therein.
Figure 5:
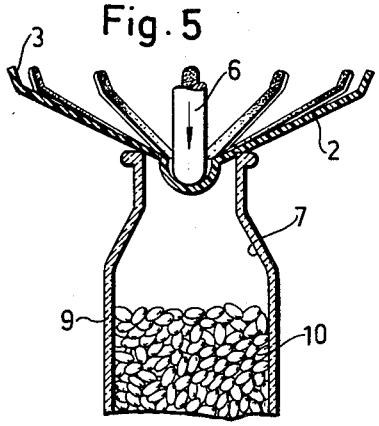
Figure 6:
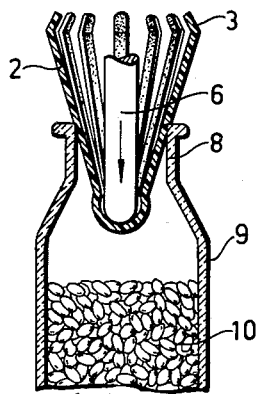
Figure 7:
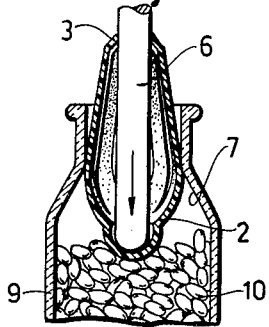
Figure 8:
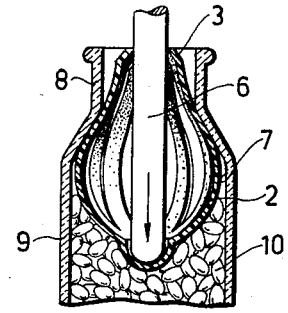
Figure 9:
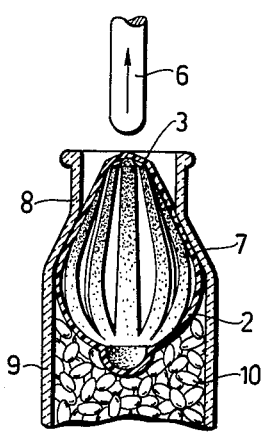
Figure 10:
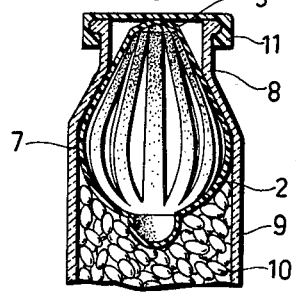

Firstly, the insert in its unrestrained condition is placed on the mouth of the tablet jar 9, the central depression 4 projecting into the mouth of the jar and the arms 2 extending beyond the rim of the mouth, as shown in FIGURE 4. Manually or by means of a suitable machine, the central portion 1 is pushed down into the jar by the aid of a mandrel 6, the end of which is received within the depression 4, the arms 2 being progressively bent toward each other about their root portions as illustrated by FIGURES 5 to 8. Due to the tapering surface 7 which forms the transition between the jar neck 8 and the jar body 9, the insert will tend to be forced downwardly by the resiliency of the bent arms 2, once the suitably smooth surface of the arms has been brought into engagement with said tapering surface. Thus, the insert will tend to move further down into the jar as soon as it has arrived in the position shown in FIGURE 7. If the degree of filling of the jar is sufficient and the arms 2 are sufficiently long, the arm ends 3 will engage the inner face of the cap 11 and the insert will be forced against the jar contents when the cap is attached (FIGURE 10), whereby the arm ends 3 may be bent more or less inwardly toward each other.

It is apparent from the figures, that the permanently bent end portions 3 of the arms, when the insert is positioned in the jar, are situated so that they cannot be clamped between the lip and the rim of the neck, which in some cases can occur if the arms are straight as in the case of the embodiment of FIGURE 1. When the insert is pressed against the tablets, pills or the like 10 in the jar, these are deprived of their freedom of movement in the same manner as when a sufficiently great wad of cotton is disposed in the jar for the same purpose.

The depression 4 of the insert serves to guide the insert when it is placed on the jar mouth and to guide the mandrel 6 by which the insert is pushed down into the jar.

The insert can be manufactured in a series of standard sizes for different sizes of jars or for different degrees of filling of the jars. From such a series it will be possible to select an insert which suits the need in each particular case.

Figure 12:
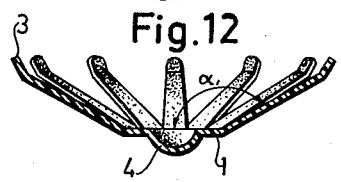
FIGURES 12 to 18 show vertical cross-sections of further embodiments of inserts according to this invention.
Figure 11:
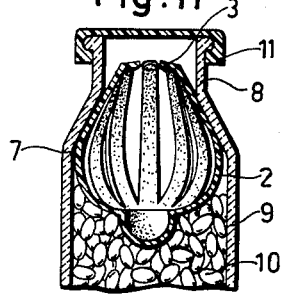
Figure 13:
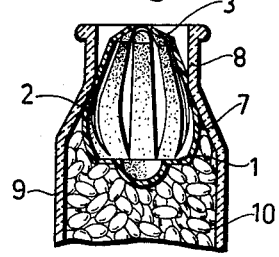

To achieve a suitable resilient action of the arms 2 these may be positioned in different angles to the central portion 1. Thus, they may be formed so that they are permanently bent adjacent the central body 1 toward the side opposite that from which the depression 4 projects, so that they form an obtuse angle $\alpha_1$ with the central body 1 and are situated on the circumference of an imaginary conical surface, as shown in FIGURE 12. Thereby, the reaction of the arms against the vessel wall will be reduced as compared to that in an insert in which the arms are in the same plane when unrestrained. FIGURE 13 shows the insert of FIGURE 12 in its elastically deformed condition after introduction thereof into a jar 9.

Figure 14:
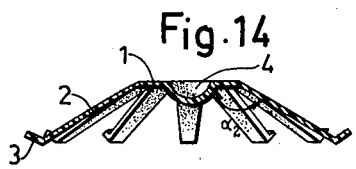
Figure 15:
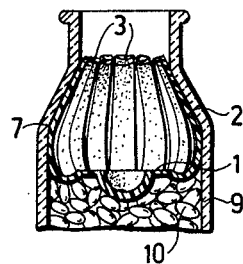

According to FIGURE 14 the arms 2 are bent adjacent their roots towards the side from which the depression 4 projects and form an obtuse angle $\alpha_2$ with the central body 1 of the insert and are situated in an imaginary conical surface in the unrestrained state of the insert. In that case, the reaction against the vessel wall will be greater than in a corresponding insert the arms of which are coplanar in the unrestrained state. FIGURE 15 shows the insert according to FIGURE 14 after the introduction thereof itno a jar 9.

Figure 16:
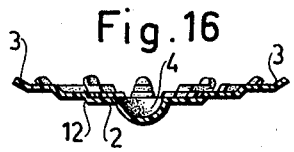
Figure 18:
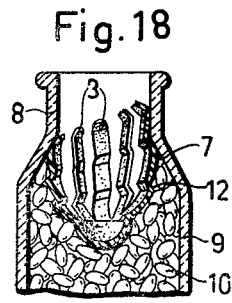

The arms 2 may be stepped in which case the various steps 12 may either be situated at similar positions in the various arms or be situated at different positions on the different arms, the latter case being illustrated in FIGURE 16. In that case the insert will be somewhat unsymmetrical and the insert tends to be positioned slightly obliquely after introduction into the jar, as seen in FIGURE 18.

Figure 17:
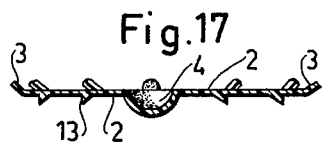

The steps may consist of protuberances 13 (FIG. 17) provided on the side of the arms which engage the inner wall of the jar when the insert is positioned. The steps or protuberances serve to enhance the downwardly directed force on the insert caused by the engagement of the arms with the inner wall of the vessel.

Figure 19:
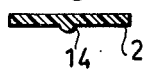
FIGURES 19 to 22 are cross-sections of the insert arms in various embodiments.
Figure 20:
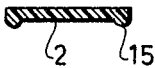
Figure 21:
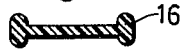
Figure 22:
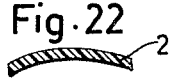

The arms of the insert need not have a flat section but may be profiled to obtain a greater resilience. In FIGURE 19 the arms have a longitudinal central bead or rib 14; in FIGURE 20 each longitudinal edge of the arm has a unilateral stiffening rib 15; in FIGURE 21 the stiffening rib 16 is bilateral and in FIGURE 22 the arm 2 has an arcuate section.

It will be understood that the embodiment shown and described are given only to exemplify the invention. Further modifications and variations of the insert are possible without departing from the scope and spirit of the invention. The shape of the vessel and the nature of the closure may be different from the showing on the drawings. The vessel may be in the form of a tube and its closure may comprise a threaded cap, a stopper or the like. I will also be understood that although the insert is shown as used in jars containing pills, tablets or the like, it may also be used for other purposes, e.g. in vessels containing preserved fruit or the like to keep the fruit immersed in liquid.

I claim:
1. An insert adapted to be removably positioned in a vessel containing tablets, pills or similar articles to prevent movement of said articles within the vessel, said insert being made of a flexible, elastically resilient material, in the shape of a spider including an essentially flat central body adapted to engage the vessel contents and a plurality of flexible narrow elongated arms radiating generally outwardly from said central body, said arms being freely flexible in a direction transverse to the plane of said central body to permit said insert to be introduced into a vessel whose mouth is substantially smaller than the outer dimensions of said insert, and said arms being of such resiliency that when bent in a direction transverse to the plane of said central body they tend to return to their original position.

2. An insert as in claim 1, in which the outer end portions of the arms are permanently bent so that when the insert is positioned in the vessel, they are directed substantially toward each other.

3. An insert as in claim 1, in which the central portion has a depression adapted to facilitate a central positioning of the insert on the vessel mouth before it is introduced into the vessel and, if desired, to receive a mandrel or similar member by which the insert is pushed into the vessel.

4. An insert as in claim 1, in which the arms adjacent the central portion are permanently bent so that in the unrestrained condition of the insert they form an obtuse angle with the central body.

5. An insert as in claim 1, in which the arms are stepped.

6. An insert as in claim 1, in which the arms have protuberances on the sides which engage the inner wall of the vessel when the insert is positioned.

7. An insert as in claim 1 in which the arms are profiled or arcuate in cross-section.

8. In combination, a vessel containing tablets, pills or similar articles and an insert positioned in said vessel above its contents to prevent movement of said articles within the vessel, said insert being made of a flexible, elastically resilient material in the form of a spider including an essentially flat central body engaging the vessel contents and a plurality of flexible narrow elongated arms radiating generally outwardly from said central body, the diameter of said insert being substantially greater than the mouth of said bottle, said arms being bent upwardly from their normal outwardly radiating position in a direction away from the vessel contents toward the vessel mouth and being of such resiliency that they tend to return to normal position and thereby pressing against the inner wall of the vessel to keep said central body in position in engagement with the vessel content.

References Cited in the file of this patent
UNITED STATES PATENTS

| | | |
|---|---|---|
| 2,489,616 | Buttery | Nov. 29, 1949 |
| 2,605,009 | Landaal | July 29, 1952 |

FOREIGN PATENTS

| | | |
|---|---|---|
| 309,026 | Switzerland | Oct. 17, 1955 |